F. W. ERICKSON.
MANDREL FOR PIPE CUTTERS.
APPLICATION FILED DEC. 7, 1917.

1,280,199. Patented Oct. 1, 1918.

UNITED STATES PATENT OFFICE.

FREDERIC WM. ERICKSON, OF NEW YORK, N. Y.

MANDREL FOR PIPE-CUTTERS.

1,280,199.  Specification of Letters Patent.  Patented Oct. 1, 1918.

Application filed December 7, 1917. Serial No. 206,091.

*To all whom it may concern:*

Be it known that I, FREDERIC WM. ERICKSON, residing at New York, in the county of New York and State of New York, have invented certain Improvements in Mandrels for Pipe-Cutters, of which the following is a specification.

This invention is an improvement upon the patent granted to me February 20, 1917, numbered 1,216,426, for a pipe cutter, and has especial reference to the means provided for preventing the pipe, while operated upon, from being crushed and for preventing the creation of a bur on the inside of the pipe ends while being cut.

The means shown and described in said patent, to which reference is made, consists of two mandrels inserted into the opposite ends of the pipe until their inner ends are in contact with each other; the pipe having been threaded through two dies, one of which is movable and the other stationary, each having cutting edges at their proximate faces which are arranged to be in line with the contacting ends of the mandrels so that upon the rotation of the movable die, which is a slicing movement, the pipe is cut in two pieces, one of which is of predetermined length.

In the present invention the mandrels are combined and loosely and elastically attached by intervening members, all of which are supported and steadied by a rod having a limiting button to determine the length of pipe to be cut off, as shown in said patent.

Figure 1:
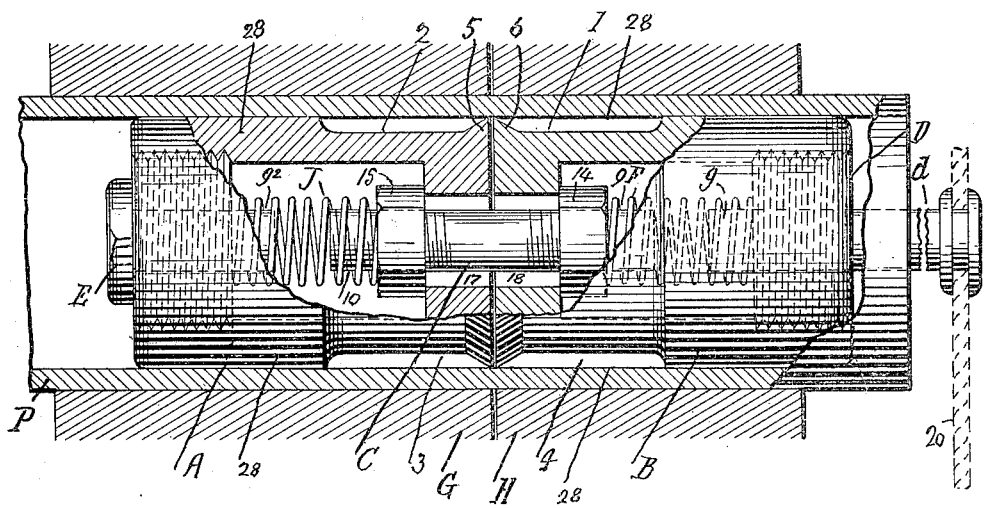

The invention therefor consists of a mandrel composed of two hollow cylindrical parts placed end to end, loosely attached by intervening members so that they may move relatively to each other in a universal manner; with means to determine the length of pipe to be cut, all of which I will now proceed to describe and point out particularly in the appended claims, reference being made to the appended drawing, of which Figure 1 is a sectional side view, showing the several parts assembled in operative position.

Figure 2:
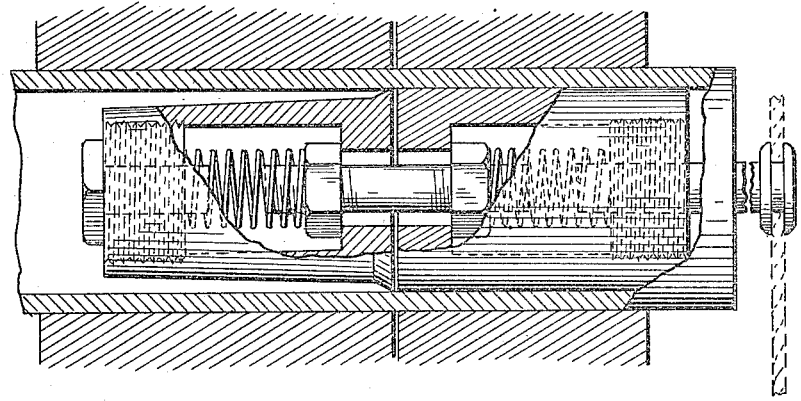

And Fig. 2 is a modification also in section.

In the drawing A and B are two hollow cylindrical sections locked to each other by the bolt C at each end of which are the nuts 14 and 15, which hold the inner surfaces of the sections to each other; the ends of the bolt C extend beyond the nuts and form the hubs 9 and 10.

The screw-caps D and E close the outer ends of the sections B and A and have inward extending hubs $g$ and $g^2$, between which and the opposing hubs 9 and 10 are supported the spiral springs J and F, which hold the bolt C firmly in position. The bolt C passes from section A to section B through the holes 17 and 18 in their ends which are of larger diameter than the bolt so that the faces of the sections may have play to slide on each other.

Each of the sections A and B are hollow ground as shown at 1, 2, 3 and 4, leaving the greatest diameter at their meeting peripheries 5, 6, constituting cutting edges.

The mandrel is represented as inserted into a metal pipe P, and the rod $d$ extending from the screw-nut D to the limiting bracket 20 which it engages, which gages the length of pipe to be cut; and also are shown in sections parts of the rotatable die G and the stationary die H, and the line 5, 6 of the inner faces of the sections A and B is in alinement with the cutting faces of the dies G, H. Reference to the patent will make the above statements clear and show that the composite mandrel provides means for the slicing movement of the pipe P at the dividing point of said dies which corresponds in alinement with the meeting faces 5, 6 of the sections of the mandrel, and as the die G presses upon the pipe the cutting face and end of section A is forced downward, as the loose and elastic arrangement of the bolt C and spiral springs allows it to do, and the two sections A and B will be out of alinement, but the bolt C will keep the faces of the said sections together on the line 5, 6. As soon as the complete cut has been made in the pipe P the sections A and B will remain in their last position by reason of the pressure of the spiral springs tending to keep them in alinement.

It is thought that the described invention constitutes a new and novel mechanical movement for a joint.

It will be seen that as the edge 5 of the member A is pressed down in the cutting operation by the movable die it is transferred in a rotary manner, and the faces 5 and 6 are kept in constant contact by the springs J and F.

In a modification in structure I do not hollow ground the surface of the section B but have the same diameter its entire length; but I do have the outer surface of the section A ground out from the inner end 5 to the outer end and preferably tapering as shown in dotted lines 28—28.

I claim as my invention:—

1. In a pipe cutting device means for preventing the pipe being crushed and for preventing the creation of a bur on the inside of the pipe while being operated on, consisting of a composite mandrel adapted to be inserted in a pipe a predetermined distance, consisting of two hollow cylindrical sections whose inner ends are held to each other elastically by intervening spiral springs and adapted to slide on each other in close contact, the outer peripheries to their abutting faces constituting cutting edges.

2. In a pipe cutting device, a composite mandrel adapted to be inserted in a pipe a predetermined distance, consisting of two hollow cylindrical sections whose inner perforated ends are held to each other, a bolt having screw-nuts on each end, the bolt extending loosely through said perforated ends, screw-caps closing the outer ends of said sections, with spiral springs between the inner ends of each screw-cap and the nuts of the bolt, and a rod extending outward from one of the screw-caps adapted to engage a suitable support.

3. In a pipe cutting device a composite mandrel adapted to be inserted into a pipe a predetermined distance, consisting of two hollow cylindrical sections placed end to end, the outer surface of one being hollow ground, and their contacting ends forming cutting edges, a bolt to hold the sections to each other passing through enlarged holes in their ends being provided with screw-nuts from the outer faces of which the bolt ends extend, of screw-caps closing the outer ends of said sections, with spiral springs between the inner ends of each screw-cap and the nuts on the bolt, and a rod extending outward from one of the screw-caps adapted to engage a stable support.

4. A pipe cutting mandrel consisting of two hollow cylindrical sections adapted to be held and steadied in a definite position, end to end, their meeting surfaces having cutting peripheries, an internal elastic connection holding said meeting surfaces to each other so that when pressure is applied externally the meeting surfaces will slide on each other.

In testimony whereof, I have signed my name to this specification in the presence of two subscribing witnesses, this 4th day of December, 1917.

FREDERIC WM. ERICKSON.

Witnesses:
E. A. DUEHN,
FRED BROOME.

Copies of this patent may be obtained for five cents each, by addressing the "Commissioner of Patents, Washington, D. C."